United States Patent
Brown et al.

(10) Patent No.: US 10,528,256 B2
(45) Date of Patent: Jan. 7, 2020

(54) PROCESSING A SPACE RELEASE COMMAND TO FREE RELEASE SPACE IN A CONSISTENCY GROUP

(71) Applicant: INTERNATIONAL BUSINESS MACHINES CORPORATION, Armonk, NY (US)

(72) Inventors: Theresa M. Brown, Tucson, AZ (US); Nicolas M. Clayton, Warrington (GB); Joshua J. Crawford, Tucson, AZ (US); Gregory E. McBride, Vail, AZ (US); Carol S. Mellgren, Tucson, AZ (US); Matthew J. Ward, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 205 days.

(21) Appl. No.: 15/604,433

(22) Filed: May 24, 2017

(65) Prior Publication Data
US 2018/0341405 A1    Nov. 29, 2018

(51) Int. Cl.
*G06F 3/06* (2006.01)
*G06F 11/14* (2006.01)

(52) U.S. Cl.
CPC ............ *G06F 3/0604* (2013.01); *G06F 3/067* (2013.01); *G06F 3/0608* (2013.01);
(Continued)

(58) Field of Classification Search
CPC ...... G06F 3/0647; G06F 3/0604; G06F 3/067; G06F 3/0619; G06F 3/0652
(Continued)

(56) References Cited

U.S. PATENT DOCUMENTS 7,246,258 B2    7/2007    Chen et al.
7,873,809 B2    1/2011    Kano
(Continued)

FOREIGN PATENT DOCUMENTS

CN    101866307 A    10/2010
CN    102012793 A    4/2011
(Continued)

OTHER PUBLICATIONS

US 20150213105 is the English counterpart of WO 2014056398.
(Continued)

*Primary Examiner* — Hua J Song
(74) *Attorney, Agent, or Firm* — David W. Victor; Konrad Raynes Davda & Victor LLP

(57) ABSTRACT

Provided are a computer program product, system, and method for processing a space release command when mirroring data at a source storage to a target storage. A space release command is received to free a release space in the source storage while transferring changed data in a consistency group. A determination is made as to whether a transfer time to transfer remaining consistency group data in the consistency group for the release space that has not been transferred exceeds a response time to process a space release command. The remaining consistency group data in the release space is transferred to the target storage in response to determining that the transfer time does not exceed the response time. The release space for the space release command is freed in response to transferring the consistency group data in the release space to the target storage.

25 Claims, 6 Drawing Sheets

(52) U.S. Cl.
CPC .......... *G06F 3/0619* (2013.01); *G06F 3/0647* (2013.01); *G06F 3/0652* (2013.01); *G06F 11/14* (2013.01)

(58) Field of Classification Search
USPC ........................................................ 711/165
See application file for complete search history.

(56) References Cited

U.S. PATENT DOCUMENTS

| | | |
|---|---|---|
| 8,712,974 B2 | 4/2014 | Datuashvili et al. |
| 9,311,016 B2 | 4/2016 | Ezra et al. |
| 9,417,917 B1 | 8/2016 | Barber et al. |
| 2007/0233980 A1 | 10/2007 | Cox et al. |
| 2009/0249116 A1 | 10/2009 | Bartfai et al. |
| 2014/0208028 A1 | 7/2014 | Coronado et al. |
| 2014/0237179 A1 | 8/2014 | Iwamura et al. |
| 2015/0052531 A1 | 2/2015 | Helak et al. |
| 2015/0213105 A1 | 7/2015 | Fan |
| 2015/0242125 A1 | 8/2015 | Benhase et al. |
| 2015/0242146 A1* | 8/2015 | Shinozaki ............... G06F 12/00 711/162 |
| 2017/0316029 A1* | 11/2017 | Shah ...................... G06F 3/0665 |

FOREIGN PATENT DOCUMENTS

| | | |
|---|---|---|
| CN | 103631633 A | 3/2014 |
| CN | 105955841 A | 9/2016 |
| WO | WO9845978 A2 | 10/1998 |
| WO | WO03052588 A2 | 6/2003 |
| WO | WO2008101317 A1 | 8/2008 |
| WO | WO2014056398 | 4/2014 |

OTHER PUBLICATIONS

"Best Practices for Data replication with EMC Isilon SyncIQ", EMC Corporation, White Paper, Feb. 2016, pp. 39.
U.S. Appl. No. 15/604,420, filed May 24, 2017.
International search report and written opinion dated Sep. 19, 2018, pp. 9.
English translation of CN101866307A dated Oct. 20, 2010, pp. 14.
English translation of CN102012793A dated Apr. 13, 2011, pp. 9.
English translation of CN103631633A dated Mar. 12, 2014, pp. 20.
English translation of CN105955841A dated Sep. 21, 2016, pp. 11.

* cited by examiner

Mirror Relationship

Space Release Objectives

PROCESSING A SPACE RELEASE COMMAND TO FREE RELEASE SPACE IN A CONSISTENCY GROUP

BACKGROUND OF THE INVENTION

1. Field of the Invention

The present invention relates to a computer program product, system, and method for processing a space release command to free release space in a consistency group.

2. Description of the Related Art

Storage volumes may be "thin provisioned", meaning that extents of storage space are assigned to the volume but not allocated until needed. Additional extents may be allocated to the volume on an extent boundary at a time when an allocated extent is first written. Extents that are allocated but not being used for a "thin provisioned" volume may be freed to be made unallocated and available to assign to other thin provisioned volumes.

The data in a thin provisioned volume may be subject to a mirror copy operation, such as an asynchronous or synchronous mirror copy operation to a secondary volume. Data may be copied in consistency groups to provide the mirroring of changed data consistent as of a consistency group time.

In current systems, if a space release command is received to free tracks within a consistency group being mirrored to a secondary volume, then the consistency group copy is cancelled to allow the space release command to complete. A new consistency group may be formed to cause the copying of all data prior to the previous consistency group formed that does not include data for the released tracks.

Described embodiments provide improved technological solutions to optimize computer technology related to processing space release commands to release space also in a consistency group in-progress of being formed.

SUMMARY

Provided are a computer program product, system, and method for processing a space release command when mirroring data at a source storage to a target storage. A space release command is received to free a release space in the source storage while transferring changed data in a consistency group. A determination is made as to whether a transfer time to transfer remaining consistency group data in the consistency group for the release space that has not been transferred exceeds a response time to process a space release command. The remaining consistency group data in the release space is transferred to the target storage in response to determining that the transfer time does not exceed the response time. The release space for the space release command is freed in response to transferring the consistency group data in the release space to the target storage.

Described embodiments allow a consistency group to continue to be formed even after receiving a space release command by determining whether the transfer time to transfer the remaining consistency group exceeds a response time goal to process a space release command. If the estimated transfer time does not exceed a response time goal, then the consistency group is allowed to continue to be formed and the release space for the space release command is freed after transferring the data for the consistency group because the transferring can be done within a response time goal. This allows the consistency group formation to proceed uninterrupted upon receiving the space release command when the time to complete forming the consistency group will not prevent the space release command from completing within a response time goal.

In a first further embodiment, the transfer time comprises time to transfer the remaining consistency group data for the release space using available space in a cache at the source storage. The transferring the remaining consistency group data for the release space to the target storage comprises using the cache to transfer at least a portion of the remaining consistency group data for the release space in response to determining that the transfer time does not exceed the response time. The release space is freed in response to copying the remaining consistency group data for the release space to at least one of the cache and the target storage. The remaining consistency group data for the release space is transferred from the cache to the target storage.

With the first further embodiment, the transfer time to transfer the consistency group data considers the use of a cache to transfer a portion of the remaining consistency group data, and the release space is freed in response to comping the consistency group data to the cache and the target storage. Using a cache to transfer consistency group data and considering the data to be transferred upon storing in the cache reduces the transfer time and thus increases the opportunity for allowing the consistency group to complete forming within the response time goal before freeing the release space.

In a second further embodiment, the determining the transfer time to transfer the remaining consistency group data for the release space using the available space in the cache comprises determining a first portion of the remaining consistency group data for the release space that can be transferred into the available space in the cache during the response time and a second portion of the remaining consistency group data for the release space that comprises the remaining consistency group data excluding the first portion of the remaining consistency group data. A determination is made as to whether a time to transfer the second portion of the remaining consistency group data for the release space to the target storage exceeds the response time. In such case, the transfer time comprises the time to transfer the second portion of the remaining consistency group data for the release space does not exceed the response time.

With the second further embodiment, to further reduce the transfer time, both the cache and direct transfer of the remaining consistency group data to the target storage may be used concurrently. In this embodiment, the transfer time comprises the time to transfer the data directly to the target storage, which takes longer than the time to transfer to a local cache. Thus, the determination of whether to allow the consistency group to be performed is based on the direct transfer time of the data to the target storage, bypassing the cache. However, this operation optimizes the transfer time by using the cache to transfer as much of the remaining consistency group data as possible to minimize the amount of data that is directly transferred of the network to the target storage, thus maximizing the use of the faster transfer path, the cache, over the slower transfer path, the transfer to the target storage, which may involve network transfer and latency.

In a third further embodiment, the transferring the remaining consistency group data for the release space when the transfer time does not exceed the response time comprises determining the first portion and the second portion to minimize the transfer time, copying to the cache the first portion of the remaining consistency group data, and transferring the second portion of the remaining consistency group data for the release space to the target storage.

With the third further embodiment, transfer operations are optimized to minimize the transfer time by transferring a first portion of the remaining consistency group data to the cache and transferring second portion of the remaining consistency group data to the target storage. Both using the faster processing cache and direct transfer to concurrently transfer the remaining consistency group data along two different paths further minimizes the transfer time to increase the likelihood that the transfer of the data for the consistency group can complete within a response time goal for completing the processing of the space release command and freeing the release space.

In a fourth further embodiment, in response to determining that a time to transfer the remaining consistency group data for the release space exceeds the response time, performing: determining whether a time since a last consistency group was completed and copied to the target storage is less than a recovery point objective time; cancelling the consistency group being formed in response to determining that the time since the last consistency group completed is less than the recovery point objective time; and freeing the release space for space release command in response to cancelling the consistency group.

With the fourth further embodiment, an additional goal of a recovery point objective time is considered which is a requirement of a time within which consistency groups must be formed. If the transfer time to transfer the remaining consistency group data cannot be completed within the response time goal for the completing of the space release command, then the consistency group may be canceled if a consistency group was last created within the recovery point objective time because the cancellation will not impede the recovery point objective time. In this case, both goals may be satisfied by cancelling the consistency group and allowing the release space to be freed well within the response time goal to complete the space release command.

In a fifth further embodiment, priorities are indicated for the response time, a recovery point objective time, and a cache limit. The cache limit indicates a maximum amount of space in cache to use to transfer data for a consistency group. In response to determining that the transfer time using first available space in the cache as defined by the cache limit exceeds the response time and a time since a last consistency group was completed exceeds the recovery point objective time, the priorities are used to determine whether to perform one of: cancelling the consistency group; transferring a first portion of the remaining consistency group data for the release space to the target storage using the first available space in the cache and transferring a second portion of the remaining consistency group data for the release space, comprising the remaining consistency group data for the release space excluding the first portion of the remaining consistency group data, to the target storage; and using a second available space in the cache beyond the cache limit to transfer the first portion of the remaining consistency group data for the release space to the cache.

With the fifth further embodiment, the computer system prioritizes different objectives, such as a response time for the space release command, a recovery point objective, and a cache limit of a maximum amount of space in cache to use to transfer data for a consistency group. The optimization may first determine which object to relax if the transfer time exceeds the response time objective and the time since the last consistency group was formed exceeds the recovery point objective. In such case, the objective with the least priority may be relaxed. This allows the user to specify which objective to relax and which ones to maintain to balance user goals if the remaining consistency group cannot be transferred using the cache limit within the required response time for the space release command. This optimizes the handling of consistency group formation when processing a space release command based on predefined objectives, such as response time, recovery point objective and a cache limit.

DETAILED DESCRIPTION

In current art, if a space release command is received to free release space that is within a consistency group in progress of being formed as part of mirroring data to a second storage system, then the consistency group is canceled to allow the free space command to proceed. Described embodiments provide improvements and optimizations to the computer technology of processing free space commands to release space also in a consistency group. With the described embodiments, a determination is made whether a transfer time to transfer remaining data in the consistency group that has not been transferred and that is within the release space exceeds a response time to process a space release command. The remaining consistency group data for tracks in the release space is transferred in response to determining that the transfer time does not exceed the response time and the space release command is executed after completing the transfer. In this way, the formation of the consistency group is allowed to complete before proceeding to execute the space release command, which will free space in the consistency group.

Described embodiments provide additional optimizations that take into account a recovery point objective time indicating a time in which new consistency groups are to be formed and a cache limit providing a maximum amount of cache that can be used for consistency group data to transfer after receiving the space release command. If the remaining consistency group data cannot be transferred using the cache within the cache limit within the response time, than described embodiments provide techniques to determine which of the objectives, response time, recovery point objective time, and cache limit, to be relaxed to determine whether to cancel the consistency group or allow the consistency group to complete before proceeding with the space release command.

Figure 1:
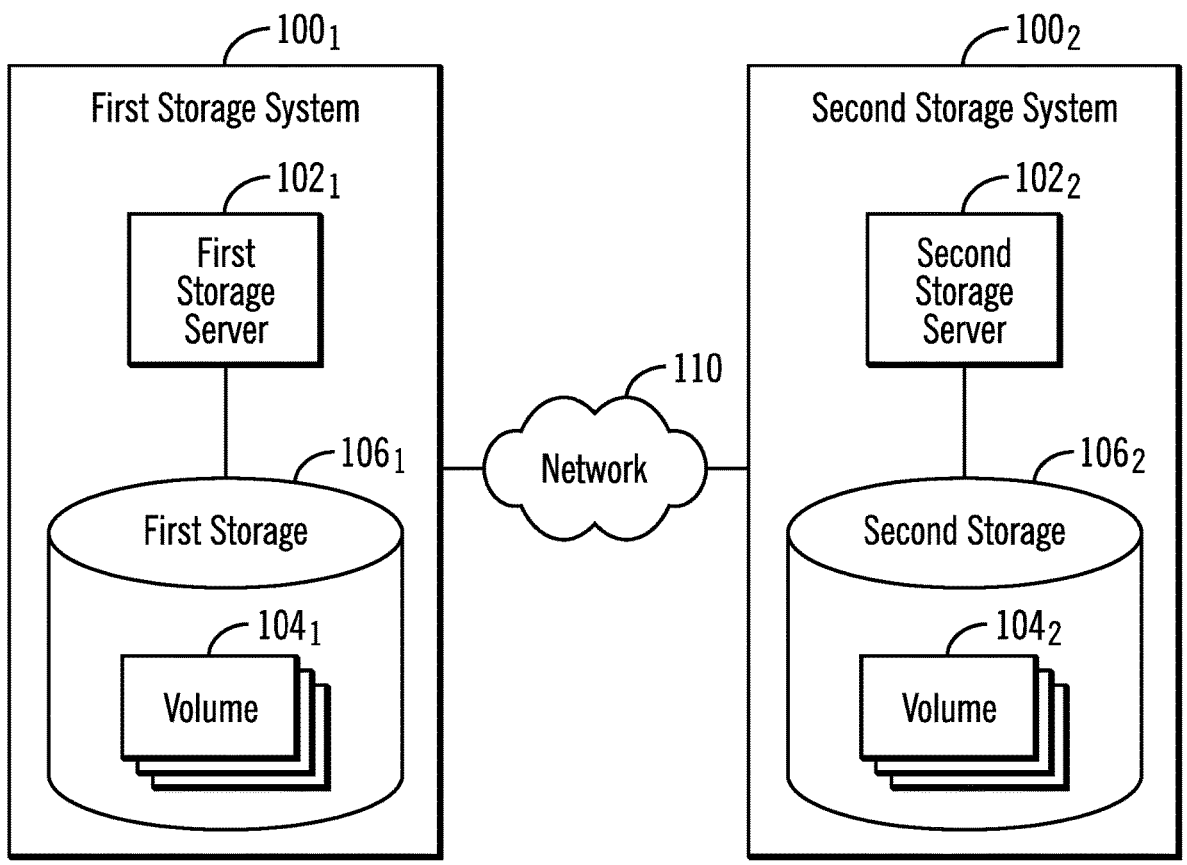
FIG. 1 illustrates an embodiment of a storage environment.

FIG. 1 illustrates an embodiment of a data storage environment having at least two storage systems $100_1$ and $100_2$, each including storage servers $102_1$ and $102_2$, respectively, managing access to volumes $104_1$ and $104_2$ configured in storages $106_1$ and $106_2$. Host systems (not shown) may perform read and write operations with respect to the first storage system $100_1$ over a storage network 110. The first storage $106_1$ may comprise a primary production volume to which hosts direct read and write request. The first storage server $102_1$ may mirror data in the volumes $104_1$ to the second storage system $100_2$ to maintain data in consistency groups at the second storage server $102_2$.

The term "storage system" as used herein may refer to a storage server $102_1$, $102_2$ and/or the storage $106_1$, $106_2$ managed by the server.

The storages $106_1$, $106_2$ may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes $104_1$, $104_2$ may further be configured from an array of devices, such as Just a Bunch of Disks (JBOD), Direct Access Storage Device (DASD), Redundant Array of Independent Disks (RAID) array, virtualization device, etc. Further, the storages $106_1$, $106_2$ may comprise heterogeneous storage devices from different vendors and different types of storage devices, such as a first type of storage devices, e.g., hard disk drives, that have a slower data transfer rate than a second type of storage devices, e.g., SSDs.

The storage network 110 used by the storage systems $100_1$ and $100_2$ to mirror data may comprise a storage network such as one or more interconnected Local Area Networks (LAN), Storage Area Networks (SAN), Wide Area Network (WAN), peer-to-peer network, wireless network, etc.

Figure 2:
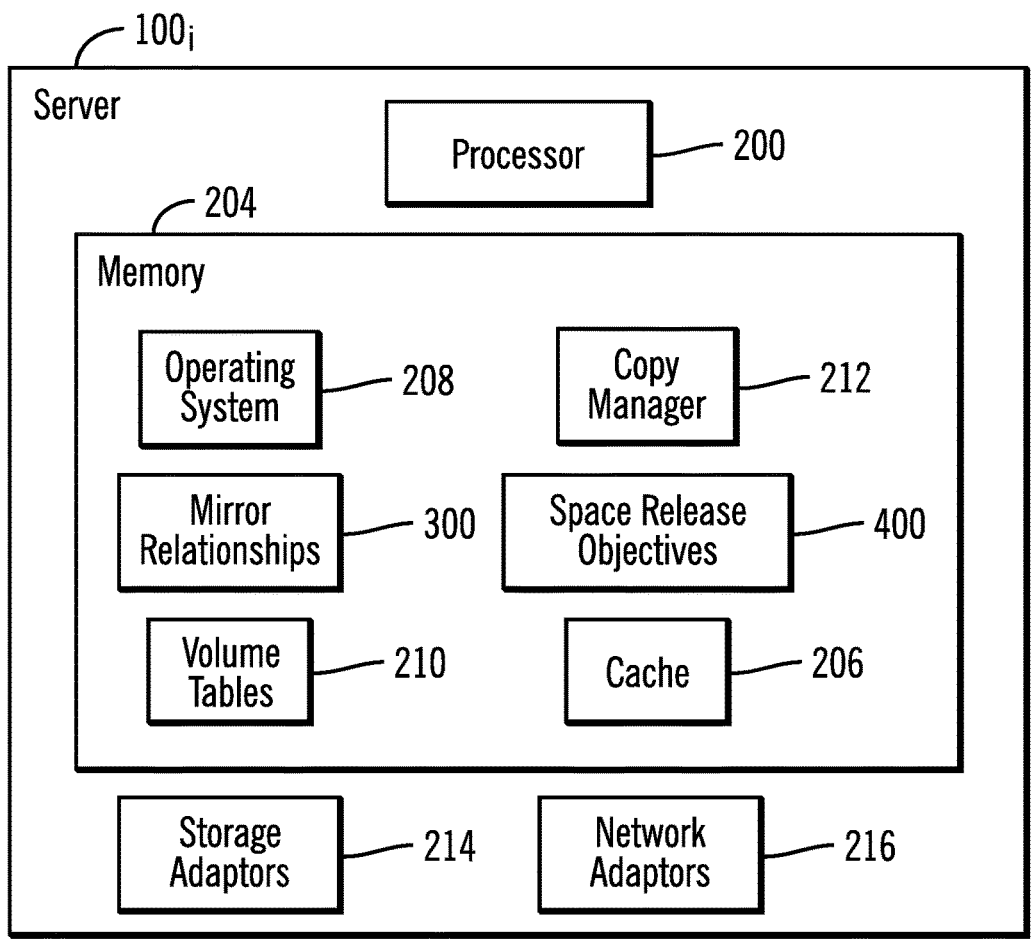
FIG. 2 illustrates an embodiment of components in a first storage server in the storage environment of FIG. 1.

FIG. 2 shows components of the first server $102_1$ including a processor 200 and a memory 204 including programs executed by the processor 200 as well as a cache 206 to cache read and write data for the first storage $106_1$. A portion of the cache 206 may also be used to transfer data in a consistency group that is subject to a space release command.

The memory 204 includes an operating system 208, which forms volumes $104_1$ and maintains volume tables 210, such as a volume table of contents (VTOC), file allocation table, etc., providing information on the configured volumes $104_1$. The operating system 208 further manages I/O requests from the host systems with respect to the volumes $104_1$ and process a space release command to release space allocated to one of the volumes $104_1$ to be available for other volumes. The operating system 208 may further manage volumes $104_1$ as thin provisioned volumes and allocate space to the provisioned but unallocated space and issue space release commands to free space allocated to a thin provisioned volume $104_1$ to make available to assign to other volumes $104_1$.

The memory 204 includes a copy manager 212 to create and manage mirror relationships 300 of source data in volumes $104_1$ in the first storage system $100_1$ to target data in the second storage system $100_2$ as part of consistency groups. The memory 204 also includes space release objectives 400 that the operating system 208, copy manager 212 and/or other component uses to determine how to process a space release command when the release space includes regions within a consistency group in progress of being mirrored to the second storage system $100_2$.

The server $100_1$ includes one or more storage adaptors 214 to communicate with devices in the first storage $106_1$ and one or more network adaptors 216 to communicate with the network 110 and mirror data in consistency groups to the second storage system $100_2$.

Figure 3:
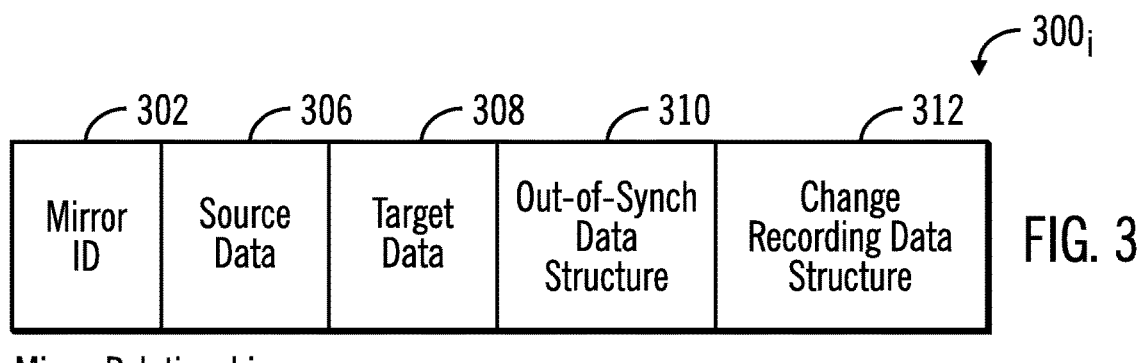
FIG. 3 illustrates an embodiment of a mirror copy relationship.

FIG. 3 illustrates an instance of a mirror relationship $300_i$, which may include a mirror identifier 302 identifying the mirror copy created by the copy manager 212; source data 306, e.g., primary volume $104_1$ at the primary storage system $100_1$, from which data is copied; target data 308, e.g., secondary volume $104_2$, at the secondary storage system $100_2$ to which the source data is copied; an out-of-synch data structure 310, such as a bitmap, indicating tracks or other data units in the source data 306 that have been changed and need to be copied to the target data 308; and change recording data structure 312, such as a change recording bitmap, indicating source 306 tracks that have been updated or changed to be included in the next consistency group to form.

To create a new consistency group, the change recording data structure 312, indicating data updated while copying changed data for the current consistency group being formed changed, is merged with the out-of-synch data structure 310, including changed data being copied for the current consistency group. After the merging, the change recording data structure 312 is cleared to record new updates for a next consistency group while the data indicated as changed in the out-of-synch data structure 310 is being copied to the target data 308 to form the current consistency group.

Figure 4:
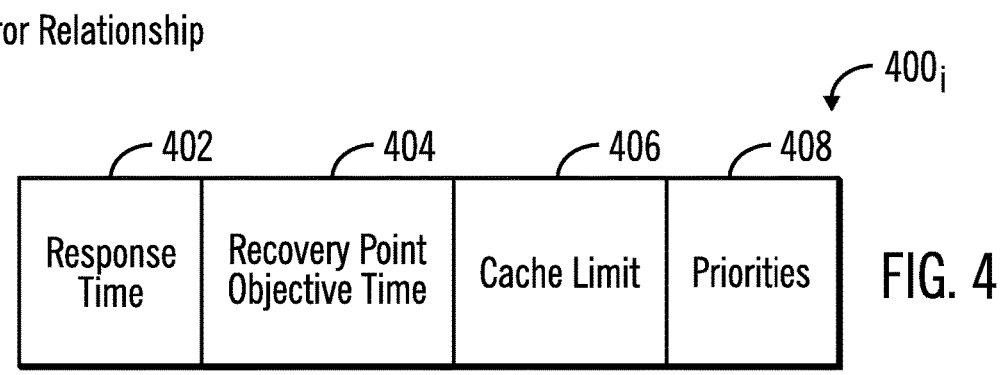
FIG. 4 illustrates an embodiment of space release objectives with respect to a consistency group and space release command.

FIG. 4 illustrates an embodiment of space release objectives 400, including: a response time 402 indicating a maximum time within which the space release command should complete; a recovery point objective time 404 indicating a maximum time between any two consistency groups, such that a new consistency group should be created within the recovery point objective time 404; a cache limit 406 indicating a maximum amount of the cache 206 that can be used to store changed data to mirror indicated in the out-of-synch data structure 310 that is being copied to the second storage system $100_2$ to reduce the time to complete copying the remaining consistency group data indicated in the out-of-synch data structure 310; and priorities 408 indicating a priority of each of the objectives 402, 404, and 406.

Figure 5:
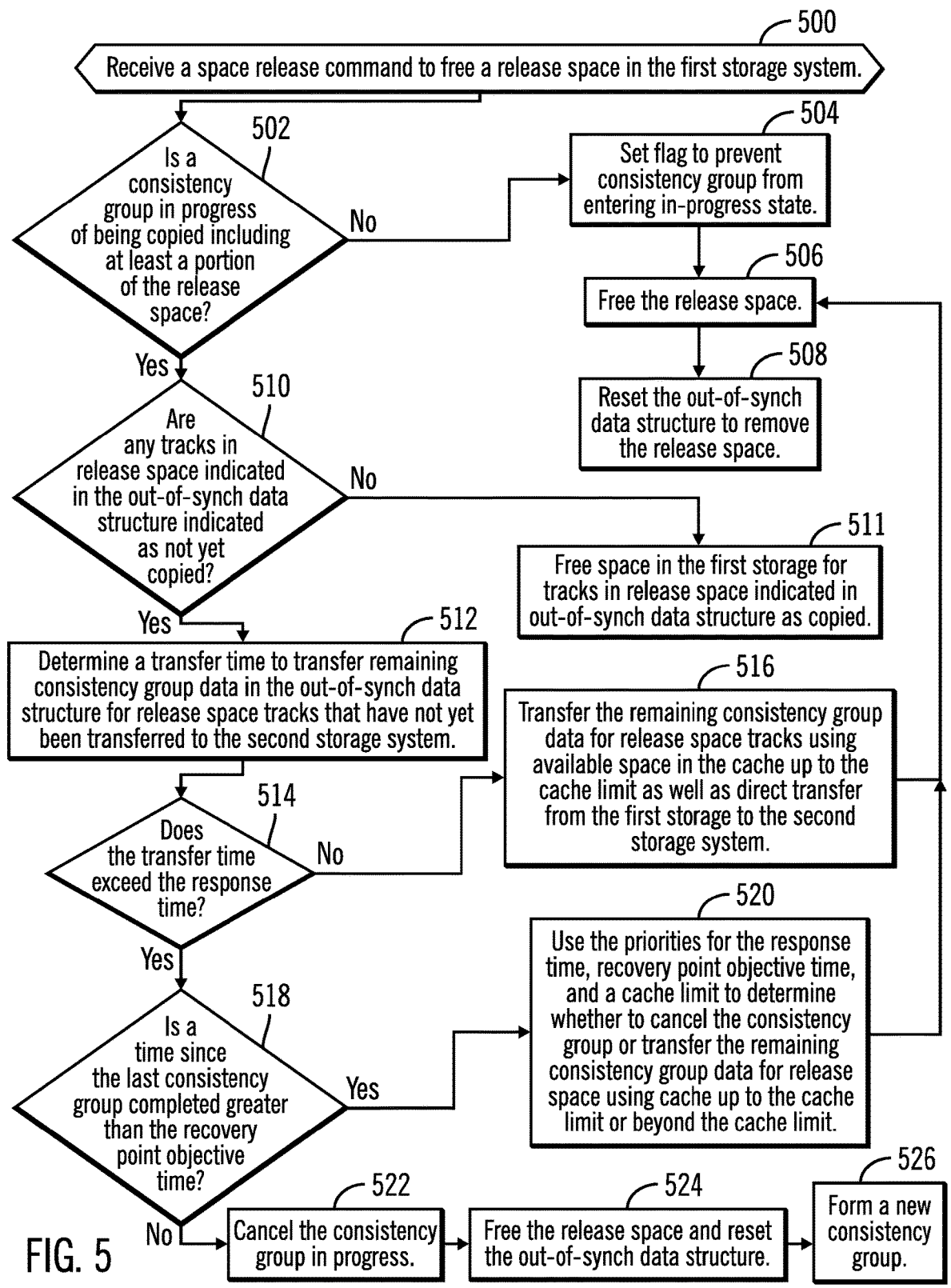
FIG. 5 illustrates an embodiment of operations to process a space release command with respect to a release space in a consistency group.

FIG. 5 illustrates an embodiment of operations performed by the operating system 208 and/or copy manager 212 to process a space release command when there are consistency groups being formed. Upon receiving (at block 500) a space release command to free a release space in the first storage $106_1$, a determination is made (at block 502) as to whether a consistency group is in progress of being copied to the second storage system $100_2$, such that data indicated in the out-of-synch data structure 310 that includes a portion of the release space is currently in progress of being copied. If there is no consistency group being copied that includes tracks in the release space, then the copy manager 212 sets (at block 504) a flag to prevent a consistency group including the release space from entering an in-progress state during which data is copied, frees the release space (at block 506), and then resets (at block 508) the out-of-synch data structure 310 to remove those tracks indicating the release space.

If (at block 502) there is a consistency group in progress of being copied, i.e., the out-of-synch data structure 310 indicates release space tracks as needing to be copied, then a determination is made (at block 510) whether there are any tracks in the release space indicated in the out-of-synch data structure 310 as not yet copied. If (at block 510) no release tracks indicated in the out-of-synch data structure 310 are not yet copied, then the operating system 208 may free the tracks indicated in the out-of-synch data structure 310 as copied. In this way, the release space tracks are not freed until the release space tracks in a consistency group have been copied to the second storage $106_2$. If (at block 510) any release space tracks are indicated in the out-of-synch data structure 310 as not yet copied, then the copy manager 212 or other component determines (at block 512) a transfer time to transfer remaining consistency group data in the out-of-synch data structure 310 for release space tracks indicated as not yet copied. The remaining consistency group data may be copied through the cache 206 and/or directly from the first storage $106_1$ through the storage adaptors 214, then to the network adaptors 216 and from there to the second storage system $100_2$, thus bypassing the cache 206. The transfer time may take into account concurrently transferring a first portion of the remaining consistency group data to the cache 206 and transfer a second portion of the remaining consistency group data, comprising the remaining consistency group data excluding the first portion, from the first storage $106_1$ directly to the second storage system $100_2$ bypassing the cache 206. The transfer time may comprise the greater of the time to transfer the first portion and the second portion of the remaining consistency group data.

If (at block 514) the determined transfer time exceeds the response time 402 objective, i.e., the response time objective 402 cannot be satisfied, then a determination is made (at block 518) as to whether a time since the last consistency group completed is greater than the recovery point objected time 404. If the time is greater, then the recovery point objective time 404 cannot be relaxed and the copy manager 212 and/or other components use (at block 520) the priorities 408 for the response time 402, recovery point objective time 404, and a cache limit 406 to determine which objective to relax, such as cancel the consistency group in progress of being copied or transfer the remaining consistency group data for release space tracks using cache 206 up to the cache limit 406 or beyond the cache limit 406. If (at block 518) the time since the last consistency group is not greater than the recovery point objective time 404, which means the consistency group can be cancelled and still satisfy the recovery point time objective, then the consistency group in progress is canceled (at block 522), the release space is freed (at block 524), and the out-of-synch data structure 310 is reset to remove indication of the tracks in the release space. The copy manager 212 may form (at block 526) a new consistency group to satisfy the recovery point objective time 404 which does not include the release space.

The embodiment of FIG. 5 allows for a space release command to be processed after a consistency group is formed by determining whether the remaining consistency group data that is in the release space can be copied over to the second storage system $100_2$ within various constraints, such as a response time objective, cache limit objective, and recovery point objective. This avoids the need to cancel the consistency group being formed by determining whether the consistency group can be completed and satisfy the various space release objectives. In further embodiments, other objectives may be considered.

Figure 6:
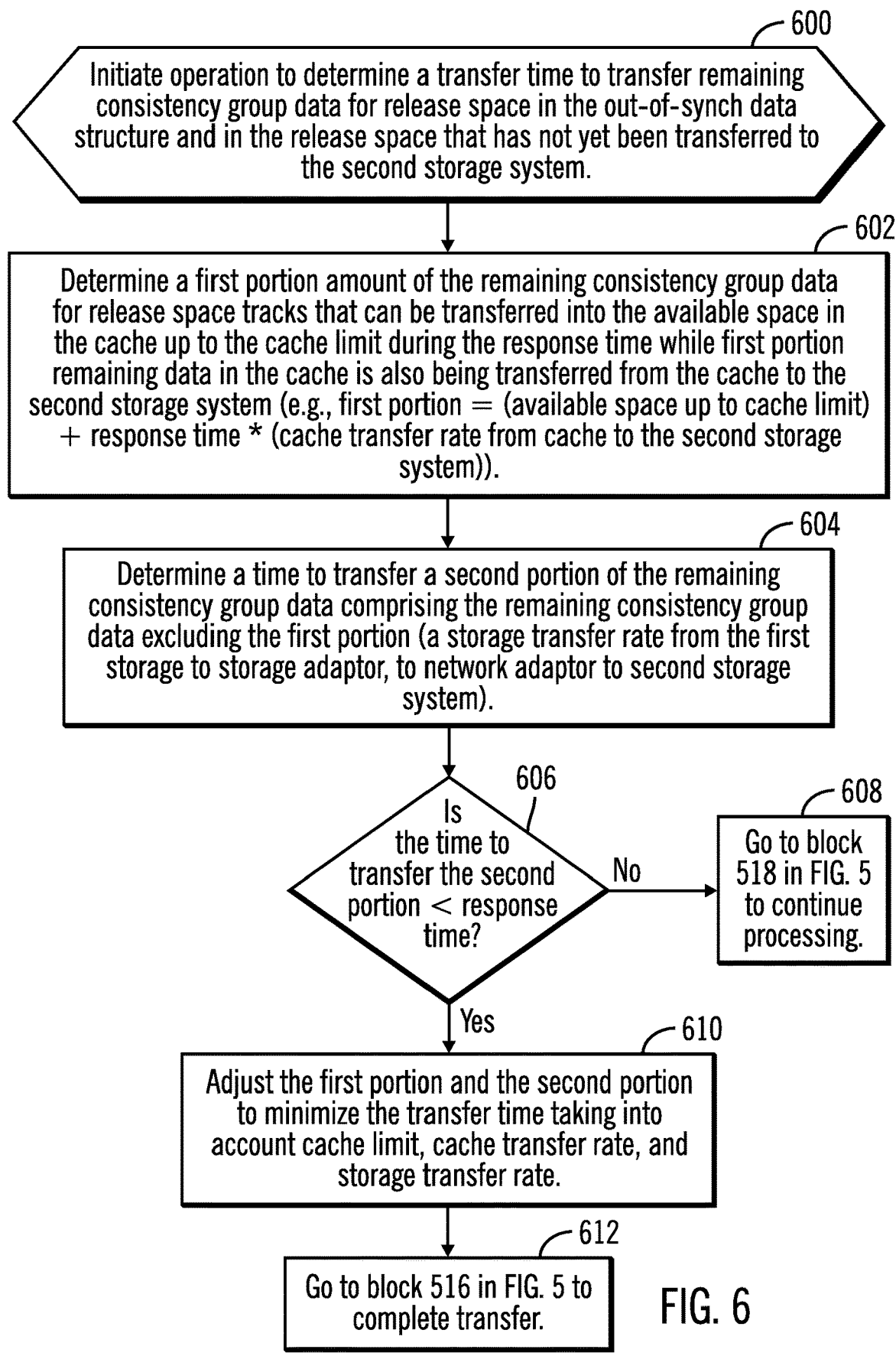
FIG. 6 illustrates an embodiment of operations to determine a transfer time to transfer remaining consistency group data in a consistency group in-progress to the second storage system.

FIG. 6 illustrates an embodiment of operations performed by the operating system 208 and/or copy manager 212 to perform the operation at block 512 in FIG. 5 to determine a time to transfer remaining consistency group data in the out-of-synch data structure 310 for the release space that has not yet been transferred to the second storage system $100_2$. Upon initiating the determination (at block 600) of the transfer time, the copy manager 212 determines (at block 602) a first portion amount of the remaining consistency group data for release space tracks that can be transferred into the available space in the cache 206 up to the cache limit 406 during the response time 402 while the first portion of the remaining consistency group data in the cache is also being transferred from the cache 206 to the second storage system $100_2$. Thus, remaining consistency group data transferred to the cache 206 may also be transferred from the cache 206 to the second storage system $100_2$ at a cache transfer rate. In one implementation, the first portion may be calculated as (available space in the cache 206 up to cache limit 406)+response time 402*(cache transfer rate)). In this way, the first portion of the remaining consistency group data transferred to the cache 206 is more than the cache limit 406 because remaining consistency group data is also being concurrently transferred out of the cache 206 to the second storage system $100_2$ at the cache transfer rate, making room for more remaining consistency group data to be streamed into the cache 206.

In an alternative embodiment, the first portion amount of the remaining consistency group data may comprise just the cache limit 406.

The copy manager 212 then determines (at block 604) a time to transfer a second portion of the remaining consistency group data for the release space, comprising the remaining consistency group data excluding the first portion. The time to transfer the second portion may comprise a storage transfer rate times an amount of bytes of the second portion of the remaining consistency group data. The storage transfer rate may comprise an estimated time to transfer a fixed amount of data from the first storage $106_1$ to storage adaptor 214, to network adaptor 216, and then to the second storage system $100_2$. The time to transfer the second portion may comprise multiplying an amount of data of the second portion times the storage transfer rate. The operations of steps 602 and 604 thus minimize the transfer time for the second portion by maximizing the amount that can be transferred via the cache 206 within the response time 402 limit and the cache size limit 406.

If (at block 606) the transfer time for the second portion is not less than the response time, then the response time 402 objective cannot be met, and control proceeds (at block 608) to block 518 in FIG. 5 to determine whether the consistency group can be cancelled and still satisfy the recovery point objective time 404. If (at block 606) the time to transfer the second portion of the remaining consistency group data is less than the response time, then the copy manager 212 may adjust (at block 610) the first portion and the second portion to minimize the transfer time taking into account cache limit, cache transfer rate, and storage transfer rate. Control then proceeds (at block 612) to block 516 in FIG. 5 to transfer the first and second portions of the remaining consistency group data to the second storage system $100_2$.

With the embodiment of FIG. 6, the time to transfer considers that first and second portions of the remaining consistency group data for release space tracks may be concurrently transferred to the cache 206 and directly to the second storage system $100_2$ over different paths to optimize the total transfer time to be within the response time required for the space release command. This increases the likelihood that data for the release space indicated as needing to be copied in the out-of-synch data structure 310 for the consistency group in-progress will be entirely transferred within a response time object to allow the space release command to be processed and completed within the response time objective 402, as well as satisfy other space release objectives, such as a recovery point objective time 404 and a cache limit 406.

Figure 7:
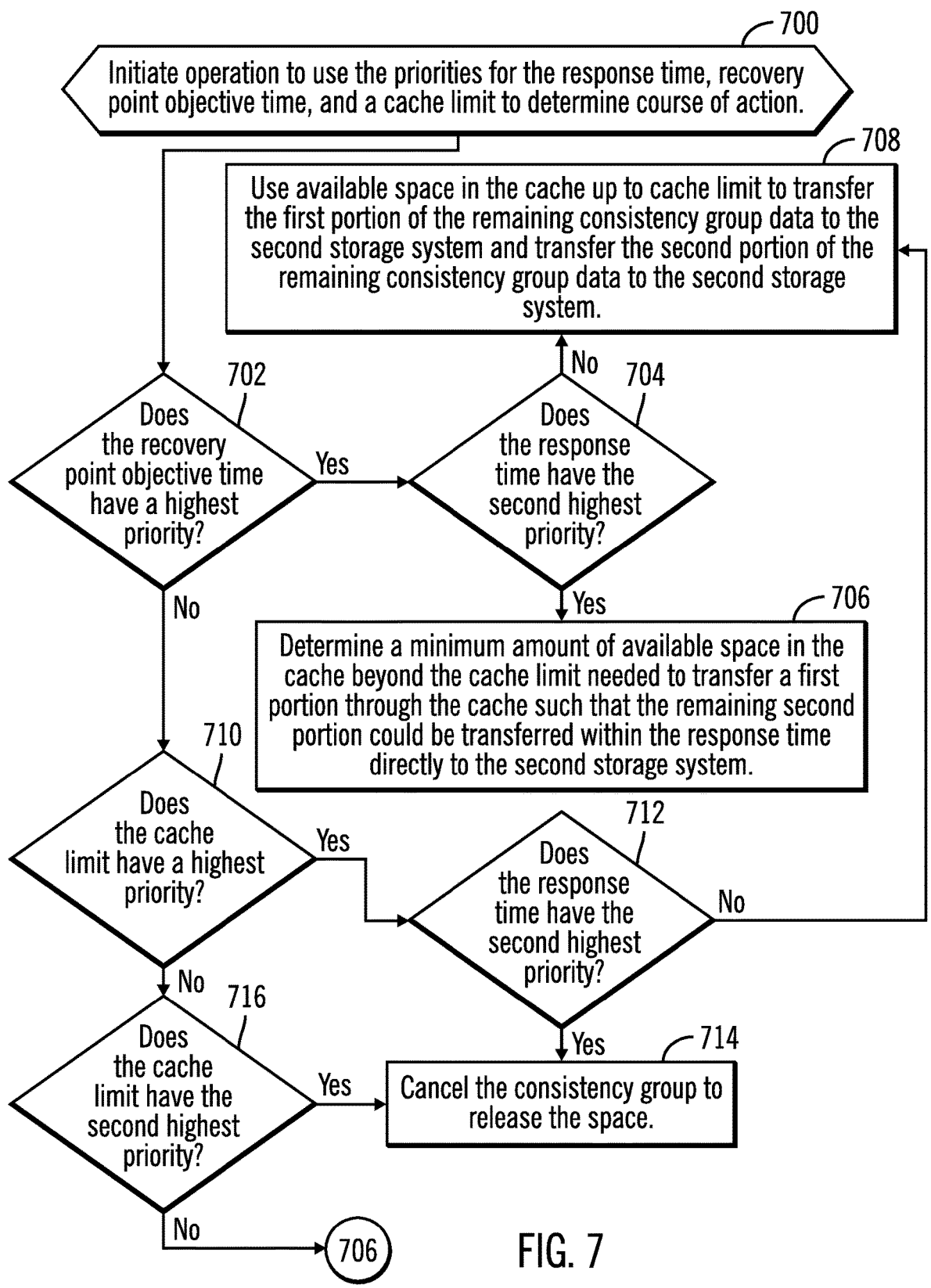
FIG. 7 illustrates an embodiment of operations to use priorities of space release objectives to determine an objective to relax to process the space release command.

FIG. 7 illustrates an embodiment of operations performed by the operating system 208 and/or copy manager 212 to perform the operation at block 520 in FIG. 5 to use the priorities 408 for the free space objectives 402, 404, 406 to determine which objective to relax, such as relax the response time objective 402 by allowing the remaining consistency group data for the release space to take longer than the response time 402 to transfer to cache 206 and second storage system $100_2$, relax the recovery point objective time 404 by cancelling the consistency group even when a time of the last completed consistency group exceeds the recovery point objective time 404 or relax the cache limit 406 by allowing the amount of cache 206 used to cache remaining consistency group data exceed the cache limit 406. Upon initiating (at block 700) the operation to use the priorities 408, the copy manager 212 and/or operating system 208 determines (at block 702) whether the recovery point objective time 404 has a highest priority. If so and if (at block 704) the response time 402 has the second highest priority, then the cache limit 406 is relaxed and a determination is made (at block 706) of a minimum amount of available space in the cache 206 beyond the cache limit 406 needed to transfer a first portion of the remaining consistency group data for the release space through the cache 206 such that the remaining second portion can be transferred directly to the second storage system $100_2$, through the adaptors 214 and 216 bypassing the cache 206, within the response time 402. In this way, the cache limit 406 is relaxed to increase the size of the first portion of the remaining consistency group data for the release space that is transferred using the cache 206, which is transferred faster than transferring the second portion bypassing cache 206 because transferring remaining consistency group data to the cache 206 is considered as having been transferred to the second storage system $100_2$, and its tracks also in the release space may be freed. Thus, by relaxing the cache limit 406 the first portion of the remaining consistency group data is increased and the second portion, taking the longer time to transfer, is reduced, also reducing the transfer time of the second portion.

If (at block 704) the cache limit 406 has the second highest priority, then the response time objective 402 is relaxed and the copy manager 212 uses (at block 708) available space in the cache 206 up to the cache limit 406 to transfer the first portion of the remaining consistency group data for the release space to the second storage system and transfer the second portion of the remaining consistency group data to the second storage system $100_2$ in a time that takes longer than the response time 402.

If (at block 702) the recovery point object time 404 does not have the highest priority and if (at block 710) the cache limit 406 has the highest priority and if (at block 712) the response time 402 has the second highest priority, then the recovery point objective time 404 has the lowest priority, and the recovery point objective may be relaxed. To relax the recovery point objective 404, the consistency group being formed is canceled (at block 714) and then the release space may be freed. If (at block 712) the recovery point objective time 404 has the second highest priority, then control proceeds to block 708 to relax the cache limit objective 406.

If (from the no branch of block 710) the response time has the highest priority and if (at block 716) the cache limit 406 has the second highest priority then control proceeds to block 714 to relax the recovery point objective time 404 and cancel the consistency group. If (at block 716) the cache limit does not have the second highest priority, then control proceeds to block 706 to relax the cache limit 406.

With the embodiment of FIG. 7, the copy manager 212 and/or other component determines which objective to relax to determine whether to increase the cache 206 space used beyond the cache limit objective 406, cancel the consistency group and violate the recovery point objective time 404 or allow the out-of-synch data structure 310 to drain within the cache limit 406 by taking more than the response time 402 to complete.

In the described embodiments, the copy operation comprises a mirror copy operation, such as an asynchronous or synchronous mirror. In alternative embodiments, the copy operation may comprise another type of copy operation such as a point-in-time copy operation, such as a snapshot copy.

The reference characters used herein, such as i, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
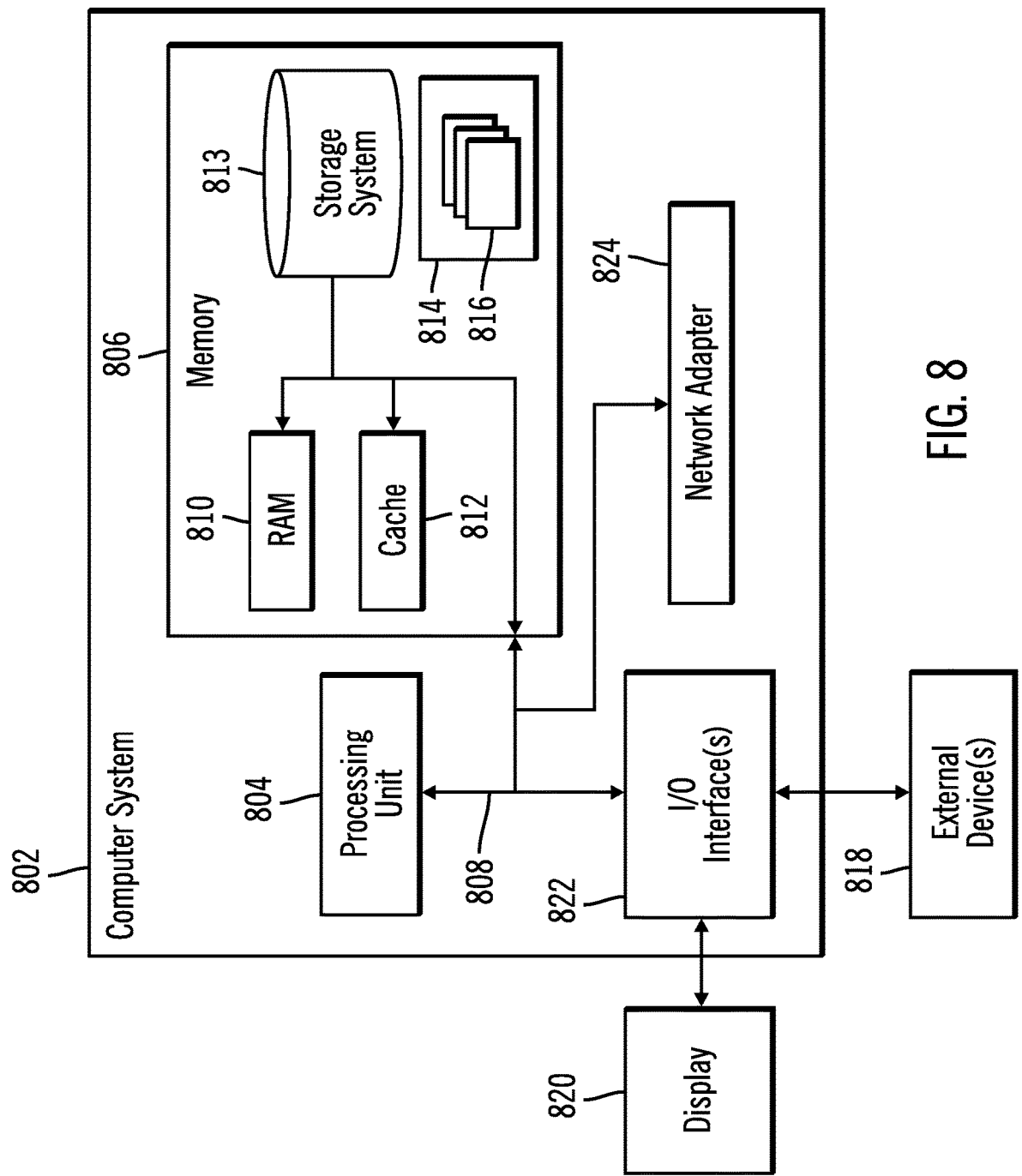
FIG. 8 illustrates a computing environment in which the components of FIG. 1 may be implemented.

The computational components of FIG. 1, including the servers $102_1$, $102_2$ may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing a space release command when mirroring data at a source storage to a target storage, wherein the computer program product comprises a computer readable storage medium having program instructions embodied therewith, the program instructions executable by a processor to cause operations, the operations comprising:
   receiving a space release command to free a release space in the source storage while transferring changed data in a consistency group;
   determining whether a transfer time to transfer remaining consistency group data in the consistency group for the release space that has not been transferred exceeds a response time to process a space release command;
   transferring the remaining consistency group data in the release space to the target storage in response to determining that the transfer time does not exceed the response time; and
   freeing the release space for the space release command in response to transferring the remaining consistency group data in the release space to the target storage.

2. The computer program product of claim 1,
   wherein the transfer time comprises time to transfer the remaining consistency group data for the release space using available space in a cache at the source storage, and
   wherein the transferring the remaining consistency group data for the release space to the target storage comprises:
      using the cache to transfer at least a portion of the remaining consistency group data for the release space in response to determining that the transfer time does not exceed the response time, wherein the freeing the release space is performed in response to copying the remaining consistency group data for the release space to at least one of the cache and the target storage; and transferring the remaining consistency group data for the release space from the cache to the target storage.

3. The computer program product of claim 2, wherein the determining the transfer time to transfer the remaining consistency group data for the release space using the available space in the cache comprises:

determining a first portion of the remaining consistency group data for the release space that can be transferred into the available space in the cache during the response time and a second portion of the remaining consistency group data for the release space that comprises the remaining consistency group data excluding the first portion of the remaining consistency group data; and determining whether a time to transfer the second portion of the remaining consistency group data for the release space to the target storage exceeds the response time, wherein the transfer time comprises the time to transfer the second portion of the remaining consistency group data for the release space does not exceed the response time.

4. The computer program product of claim 3, wherein the first portion of the remaining consistency group data for the release space comprises an amount of data that can be transferred into the cache during the response time while remaining consistency group data for the release space transferred into the cache is being transferred from the cache to the target storage during the response time, wherein the first portion of the remaining consistency group data for the release space is a function of a cache limit and a cache transfer rate from the cache to the target storage during the response time.

5. The computer program product of claim 3, wherein the transferring the remaining consistency group data for the release space when the transfer time does not exceed the response time comprises:

determining the first portion and the second portion to minimize the transfer time;

copying to the cache the first portion of the remaining consistency group data; and transferring the second portion of the remaining consistency group data for the release space to the target storage.

6. The computer program product of claim 5, wherein the source storage is in a first storage system and the target storage is in a second storage system, wherein the transferring the second portion of the remaining consistency group data for the release space comprises transferring the second portion from a storage adaptor in the first storage system to a network adaptor in the first storage system to a network to transfer to the second storage system without using the cache.

7. The computer program product of claim 6, wherein the time to transfer the second portion of the remaining consistency group data for the release space comprises dividing an amount of the second portion of the remaining consistency group data for the release space by an estimated transfer rate comprising an estimated time to access a fixed amount of data from the first storage system and transfer through the storage adaptor and the network adaptor to the second storage system.

8. The computer program product of claim 1, wherein in response to determining that a time to transfer the remaining consistency group data for the release space exceeds the response time, performing:

determining whether a time since a last consistency group was completed and copied to the target storage is less than a recovery point objective time;

cancelling the consistency group being formed in response to determining that the time since the last consistency group completed is less than the recovery point objective time; and freeing the release space for space release command in response to cancelling the consistency group.

9. The computer program product of claim 1, wherein the operations further comprise:

indicating priorities for the response time, a recovery point objective time, and a cache limit, wherein the cache limit indicates a maximum amount of space in cache to use to transfer data for a consistency group; and in response to determining that the transfer time using a first available space in the cache as defined by the cache limit exceeds the response time and a time since a last consistency group was completed exceeds the recovery point objective time, using the priorities to determine whether to perform one of: cancelling the consistency group; transferring a first portion of the remaining consistency group data for the release space to the target storage using the first available space in the cache and transferring a second portion of the remaining consistency group data for the release space, comprising the remaining consistency group data for the release space excluding the first portion of the remaining consistency group data, to the target storage; and using a second available space in the cache beyond the cache limit to transfer the first portion of the remaining consistency group data for the release space to the cache.

10. The computer program product of claim 9, wherein the using the priorities comprises:

in response to the recovery point objective time having a higher priority than the cache limit and the cache limit having a priority than the response time, using the first available space in the cache to transfer the first portion of the remaining consistency group data for the release space to the target storage and transferring the second portion of the remaining consistency group data for the release space to the target storage; and in response to the recovery point objective time having a higher priority than the response time and the response time having a higher priority than the cache limit, using the second available space in the cache beyond the cache limit to transfer the first portion of the remaining consistency group data for the release space to the cache.

11. The computer program product of claim 9, wherein the using the priorities comprises:

in response to the cache limit having a higher priority than the recovery point objective time and the recovery point objective time having a higher priority than the response time, transferring the first portion of the remaining consistency group data for the release space using the first available space in the cache; and in response to the cache limit having a higher priority than the response time and the response time having a higher priority than the recovery point objective time, failing the consistency group and performing the freeing of the release space in response to failing the consistency group.

12. The computer program product of claim 9, wherein the using the priorities comprises:
  in response to the response time having a higher priority than the recovery point objective time and the recovery point objective time having a higher priority than the cache limit, transferring the first portion of the remaining consistency group data for the release space to the second available space in the cache; and
  in response to the response time having a higher priority than the cache limit and the cache limit having a higher priority than the recovery point objective time, failing the consistency group and performing the freeing of the release space in response to failing the consistency group.

13. The computer program product of claim 9, wherein the using the priorities comprises:
  in response to the cache limit having a lowest of the priorities, copying the first portion of the remaining consistency group data to the cache exceeding the cache limit, wherein the second portion of the remaining consistency group data for the release space is transferred to the target storage;
  in response to the response time having a lowest of the priorities, copying the first portion of the remaining consistency group data for the release space into the cache within the cache limit and transferring a second portion of the remaining consistency group data for the release space that exceeds the cache limit to the target storage; and
  in response to the recovery point objective time having the lowest of the priorities, failing the consistency group and performing the freeing of the release space in response to failing the consistency group.

14. A system for processing a space release command when mirroring data at a source storage to a target storage, comprising:
  a processor; and
  a computer readable storage medium having program instructions embodied therewith, the program instructions executable by the processor to cause operations, the operations comprising:
    receiving a space release command to free a release space in the source storage while transferring changed data in a consistency group;
    determining whether a transfer time to transfer remaining consistency group data in the consistency group for the release space that has not been transferred exceeds a response time to process a space release command;
    transferring the remaining consistency group data in the release space to the target storage in response to determining that the transfer time does not exceed the response time; and
    freeing the release space for the space release command in response to transferring the remaining consistency group data in the release space to the target storage.

15. The system of claim 14,
  wherein the transfer time comprises time to transfer the remaining consistency group data for the release space using available space in a cache at the source storage, and
  wherein the transferring the remaining consistency group data for the release space to the target storage comprises:
    using the cache to transfer at least a portion of the remaining consistency group data for the release space in response to determining that the transfer time does not exceed the response time, wherein the freeing the release space is performed in response to copying the remaining consistency group data for the release space to at least one of the cache and the target storage; and
    transferring the remaining consistency group data for the release space from the cache to the target storage.

16. The system of claim 15, wherein the determining the transfer time to transfer the remaining consistency group data for the release space using the available space in the cache comprises:
  determining a first portion of the remaining consistency group data for the release space that can be transferred into the available space in the cache during the response time and a second portion of the remaining consistency group data for the release space that comprises the remaining consistency group data excluding the first portion of the remaining consistency group data; and
  determining whether a time to transfer the second portion of the remaining consistency group data for the release space to the target storage exceeds the response time, wherein the transfer time comprises the time to transfer the second portion of the remaining consistency group data for the release space does not exceed the response time.

17. The system of claim 16, wherein the transferring the remaining consistency group data for the release space when the transfer time does not exceed the response time comprises:
  determining the first portion and the second portion to minimize the transfer time;
  copying to the cache the first portion of the remaining consistency group data; and
  transferring the second portion of the remaining consistency group data for the release space to the target storage.

18. The system of claim 14, wherein in response to determining that a time to transfer the remaining consistency group data for the release space exceeds the response time, performing:
  determining whether a time since a last consistency group was completed and copied to the target storage is less than a recovery point objective time;
  cancelling the consistency group being formed in response to determining that the time since the last consistency group completed is less than the recovery point objective time; and
  freeing the release space for space release command in response to cancelling the consistency group.

19. The system of claim 14, wherein the operations further comprise:
  indicating priorities for the response time, a recovery point objective time, and a cache limit, wherein the cache limit indicates a maximum amount of space in cache to use to transfer data for a consistency group; and
  in response to determining that the transfer time using a first available space in the cache as defined by the cache limit exceeds the response time and a time since a last consistency group was completed exceeds the recovery point objective time, using the priorities to determine whether to perform one of: cancelling the consistency group; transferring a first portion of the remaining consistency group data for the release space to the target storage using the first available space in the cache and transferring a second portion of the remaining consistency group data for the release space, comprising the remaining consistency group data for the release space excluding the first portion of the remaining consistency group data, to the target storage; and using a second available space in the cache beyond the cache limit to transfer the first portion of the remaining consistency group data for the release space to the cache.

20. A method for processing a space release command in a computing system when mirroring data at a source storage to a target storage, comprising:

receiving a space release command to free a release space in the source storage while transferring changed data in a consistency group;

determining whether a transfer time to transfer remaining consistency group data in the consistency group for the release space that has not been transferred exceeds a response time to process a space release command;

transferring the remaining consistency group data in the release space to the target storage in response to determining that the transfer time does not exceed the response time; and freeing the release space for the space release command in response to transferring the remaining consistency group data in the release space to the target storage.

21. The method of claim 20, wherein the transfer time comprises time to transfer the remaining consistency group data for the release space using available space in a cache at the source storage, and wherein the transferring the remaining consistency group data for the release space to the target storage comprises:

using the cache to transfer at least a portion of the remaining consistency group data for the release space in response to determining that the transfer time does not exceed the response time, wherein the freeing the release space is performed in response to copying the remaining consistency group data for the release space to at least one of the cache and the target storage; and transferring the remaining consistency group data for the release space from the cache to the target storage.

22. The method of claim 21, wherein the determining the transfer time to transfer the remaining consistency group data for the release space using the available space in the cache comprises:

determining a first portion of the remaining consistency group data for the release space that can be transferred into the available space in the cache during the response time and a second portion of the remaining consistency group data for the release space that comprises the remaining consistency group data excluding the first portion of the remaining consistency group data; and determining whether a time to transfer the second portion of the remaining consistency group data for the release space to the target storage exceeds the response time, wherein the transfer time comprises the time to transfer the second portion of the remaining consistency group data for the release space does not exceed the response time.

23. The method of claim 22, wherein the transferring the remaining consistency group data for the release space when the transfer time does not exceed the response time comprises:

determining the first portion and the second portion to minimize the transfer time;

copying to the cache the first portion of the remaining consistency group data; and transferring the second portion of the remaining consistency group data for the release space to the target storage.

24. The method of claim 20, wherein in response to determining that a time to transfer the remaining consistency group data for the release space exceeds the response time, performing:

determining whether a time since a last consistency group was completed and copied to the target storage is less than a recovery point objective time;

cancelling the consistency group being formed in response to determining that the time since the last consistency group completed is less than the recovery point objective time; and freeing the release space for space release command in response to cancelling the consistency group.

25. The method of claim 20, further comprising:

indicating priorities for the response time, a recovery point objective time, and a cache limit, wherein the cache limit indicates a maximum amount of space in cache to use to transfer data for a consistency group; and in response to determining that the transfer time using first available space in the cache as defined by the cache limit exceeds the response time and a time since a last consistency group was completed exceeds the recovery point objective time, using the priorities to determine whether to perform one of: cancelling the consistency group; transferring a first portion of the remaining consistency group data for the release space to the target storage using the first available space in the cache and transferring a second portion of the remaining consistency group data for the release space, comprising the remaining consistency group data for the release space excluding the first portion of the remaining consistency group data, to the target storage; and using a second available space in the cache beyond the cache limit to transfer the first portion of the remaining consistency group data for the release space to the cache.

* * * * *